Dec. 9, 1969  G. HÜTZ  3,482,675
TWIN CONVEYER SYSTEM FOR THE TRANSPORT OF LOOSELY COHERENT MATS
Filed March 13, 1968
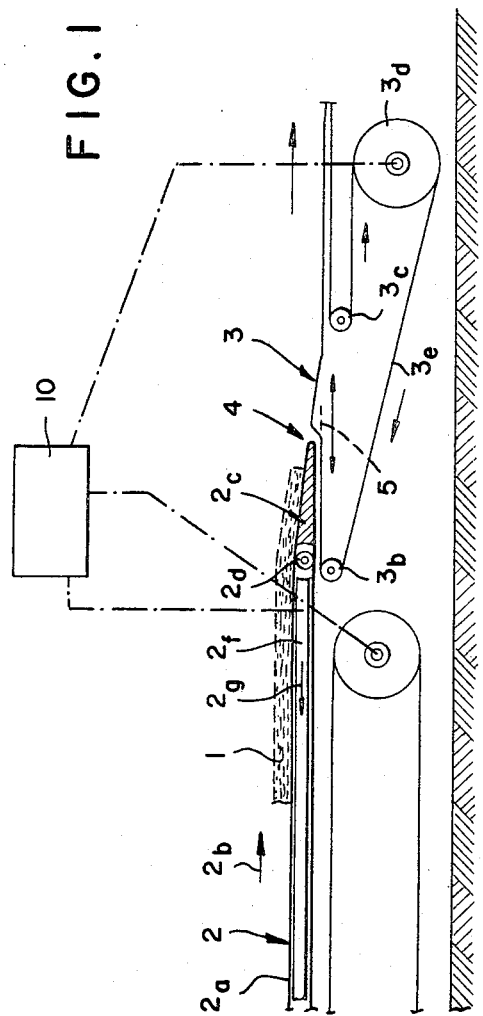
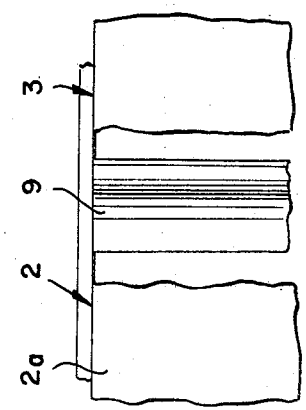
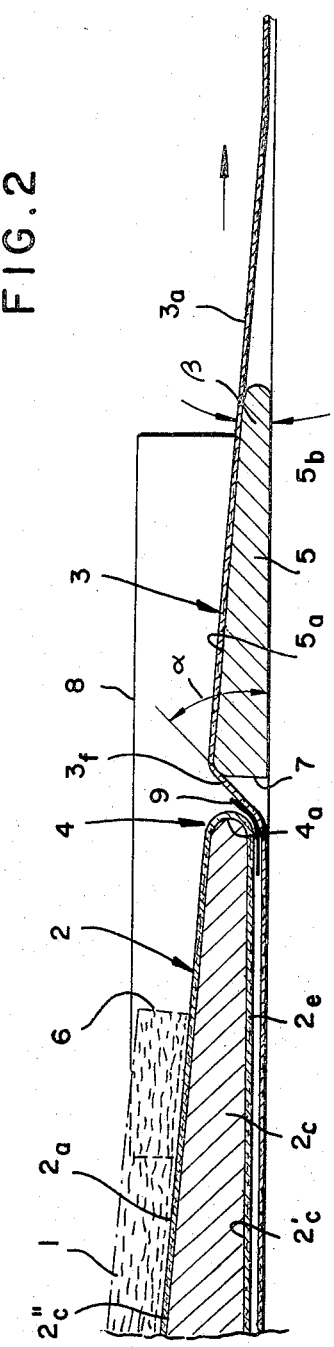
INVENTOR.
GERHARD HÜTZ
BY
ATTORNEY United States Patent Office 3,482,675
Patented Dec. 9, 1969

3,482,675
TWIN CONVEYER SYSTEM FOR THE TRANSPORT OF LOOSELY COHERENT MATS
Gerhard Hütz, Suchteln, Germany, assignor to G. Siempelkamp & Co., Krefeld, Germany, a corporation of Germany
Continuation-in-part of application Ser. No. 672,639, Oct. 3, 1967. This application Mar. 13, 1968, Ser. No. 712,687
Claims priority, application Germany, Mar. 14, 1967, S 108,808
Int. Cl. B65g *37/00, 47/52*
U.S. Cl. 198—102                                           6 Claims

ABSTRACT OF THE DISCLOSURE

A transport system for the deposition of a loosely coherent mate from a depositing conveyer onto a receiving conveyer, wherein the depositing conveyer has an upper reach of the depositing conveyer and a wedge-shaped dereaction of a discharge edge of the forward conveyer at which the upper reach is turned under to form a return reach of the depositing conveyer and a wedge-shaped deflecting body having an upper surface inclined downwardly in the direction is disposed beneath the upper reach of the receiving conveyer ahead of the discharge side so as to render said receiving and depositing conveyer substantially coplanar in the region of said discharge side and deflecting the upper reach of the receiving conveyer in generally S-shaped configuration onto the upper surface of said deflecting body.

This application is a continuation-in-part of application Ser. No. 672,639, filed Oct. 3, 1967.

In the aforementioned copending application, I have described and claimed a method of and an apparatus for the charging of platen presses with relatively loosely coherent mat-like sheets of fiber for the hot-pressing of these mats into rigid or semirigid coherent bodies whose density depends upon the nature of the fibers, the presence or type of binder and the temperature and pressure conditions within the press. Prior to the disclosure of this system, various methods of transporting and compressing sheet material have been described especially for the formation of so-called pressed board. In these system, the fibrous material is generally cellulosic in nature and may be wood chips or dust, exploded wood fibers, waste cellulosic materials or the like. In some cases, the binder is the natural lignin and abietic resins within the wood while in other instances phenol-formaldehyde and other thermosetting resins (e.g. urea and resorcinol) are used as binders. The press is usually provided on one side with the pressure-charging station adapted to successively or simultaneously charge all of the stages of a multiplaten press with such mats or designed to feed a succession of crude mats of loosely coherent material between the platens of a single-stage press. In this application, I provide a single level or multilevel press, generally designated a platen press, having at least two vertically spaced horizontal platens relatively shiftable between an open position defining the space between the pairs of platens and a closed position in which a mat of noncoherent or relatively loosely coherent fibres is compressed. A charging conveyer pallet receives the fibrous mat from a dispensing station and deposits the mat within the space between the platens; the conveyor pallet has an endless drivable conveyer band forming a mat-receiving surface and a side for discharging the mat upon movement of the band in one direction as the pallet is drawn simultaneously in the opposite direction, thereby preventing distortion of the mat. According to the key feature of this invention there described, a mat of such fibers with thermally activatable binder is deposited upon the receiving surface or upper reach of the band of the conveyer pallet in the position of this conveyer belt outside the press such that a leading edge of the mat is spaced from the discharge side of the conveyer band. The pallet is then inserted into the space between the platens, and the mat-carrying surface is driven toward the discharge side while the conveyer pallet is between the platens and the latter is drawn in the opposite direction synchronously with the displacement of the mat-carrying surface. The leading edge of the mat is positioned with respect to the discharge side of the band such that it passes over the edge at this side along which the conveyer is deflected from its upper reach to its lower reach only when the speed of the conveyer has reached its maximum or so-called mat-deposition speed, thereby depositing the mat at a constant and optimum rate upon the bed platen of the press. The discharge side of the conveyer platen is formed with a downwardly converging tongue which constitutes a ramp inclined toward the receiving surface so that the mat is deposited without distortion. In U.S. Patent No. 3,224,758, issued Dec. 21, 1965 and owned by the assignee of this application, there is described a system whereby similar principles are used to deposit loosely coherent mats of sheet material without distortion from an upper conveyer onto a lower conveyer.

In the system of the latter patent, the upper conveyer has a discharge side which discharges the loosely coherent mat from its upper reach onto the upper reach of a synchronously displaced lower conveyer, the discharge edge about which the upper conveyer, band is turned under being retracted synchronously with the advance of the mat to position the upper reach for receipt of the next mat and expedite transfer of the preceding mat to the lower conveyer.

It has been found that such systems are highly effective for the high rate transportation of loosely coherent sheets without applying to them the tensions which would cause distortion and possible destruction of the mats. These systems have not, however, been able adequately to solve a problem arising from the fact that, as the mat passes over the discharge side of the conveyer, it is often forced to drop through a vertical distance between the end of the upper reach of the depositing conveyer onto the surface of the upper reach of the receiving conveyer. The resulting drop causes distortion of the sheet. If attempts are made to reduce this drop by providing a tongue of converging configuration at the discharge side of the depositing conveyer, its band must bend sharply, thereby possibly causing damage thereto.

It is, therefore, the principal object of the present invention to provide a mat-transporting device which extends the principles of the aforementioned earlier systems and permits undistorted deposition of a sheet from one transport conveyer onto a receiving conveyer with minimum sheet distortion and without damage to the conveyer band of the upper conveyer.

The present invention accomplishes this object and others which will be apparent hereinafter by deflecting the upper reach of the lower or receiving conveyer upwardly ahead of the discharge tongue of the upper conveyer and defining an inclined portion of the lower conveyer substantially contiguously with the discharge side of the upper conveyer and coplanar with the corresponding reach of its conveyer band. Thus, just ahead of the region at which the depositing conveyer turns under its discharge edge, a deflecting body is provided which is coupled with the tongue for movement relative to the lower conveyer synchronously with the band movement of the upper or depositing conveyer to act as a deflecting means in the manner described. The deflecting means may be a wedge-shaped relatively thin body whose upper and lower surfaces converge in the direction of movement of the loosely coherent mats and engages the receiving conveyer band from below to deflect it upwardly around the discharge edge of the upper conveyer in substantially S-shaped or stepped configuration.

While direct contact may be permitted between the deflected upper reach of the receiving conveyer and the underturned return reach of the depositing or upper conveyer. I prefer to provide a separating member or sheet metal of low-friction material along the underside of the transfer tongue of the upper conveyer as a partition between the underlying upper reach of the receiving conveyer and the return reach of the upper conveyer. The system may be used for the charging of multiplaten presses as described in the aforementioned patent or for advancing sheets to the press of my copending application identified earlier.

The above and other objects, features and advantages of the present invention will become more readily apparent from the following description, reference being made to the accompanying drawing in which:

FIG. 1 is a diagrammatic elevational view, partly in section, illustrating the system of the present invention;

FIG. 2 is a detail view of the mat region of this system; and

FIG. 3 is a plan view of a portion of the assembly.

In the following description, it will be understood that the means for synchronizing the upper and lower belts and for displacing the movable sides of the conveyers can be constituted as described and illustrated in the aforementioned U.S. patent. Furthermore, it will be appreciated that the device is particularly adapted for use in a plant for the production of pressed board in which the mats are fiber sheets.

In FIG. 1, I show a depositing conveyer 2, whose upper reach 2a has a forward direction of displacement as represented by an arrow 2b and receives a mat 1 of loosely coherent fibers for the formation of chipboard, fiberboard or other pressed-board plates in a heated-platen press to the right of the receiving conveyer 3 but not here illustrated. The upper reach 2a of the conveyer 2 passes over a tongue 2c ahead of the roller 2d, the tongue 2c having a horizontal underside 2c' and a downwardly but forwardldy inclined upper surface 2c'' along which the band passes at the end of its upper reach 2a. At the discharge side of the depositing conveyor 2, I provide a reversing edge 4 in the form of a rounded portion 4a at which the band is deflected to form of the tongue 2c at which the band is deflected to form the lower reach 2e. As indicated earlier, the upper reach 2a has a support 2f which is displaceable in the direction of arrow 2g, i.e. oppositely to the direction of forward band displacement 2b, to retract the tongues 2c and 2d synchronously with the advance of the band so as to deposit the mat 1 upon the upper reach 3a of the receiving conveyer without relative movement of the receiving conveyer and the mat 1. The synchronization of the bands is ensured by a control means represented at 10 but of the type described in the aforementioned patent and the art cited therein. Since the tongue 2c is retracted (arrow 2g) simultaneously and synchronously with displacement of the upper reach 2a (arrow 2b), the speed of deposition of the mat 1 is equal substantially to twice the speed of band 2, the band 3 being operated at this higher rate. The upper reach 3a of the receiving band 3 is designed to carry the mat 1 to a press-charging apparatus or the like. This upper reach 3a passes about an idler 3b which is substantially stationary and underlies the tongue 2c in substantially all positions thereof so that the band 3, returning from its remote idler not shown, passes over a tensioning idler 3c, a drive drum 3d and forms a lower stretch 3e leading to the roller 3b.

In accordance with the present invention, the tongue 2c (FIG. 2) is provided with a pair of cantilever supports 8 along its opposite sides (only one shown) which carry a wedge-shaped deflecting body 5 whose upper surface 5a supports the deflected upper reach 3a and constitutes of the latter a receiving surface which is coplanar with the surface of the upper reach 2a passing along the face 2c'' of the tongue 2c. Thus, the body 5 is wedge-shaped with its upper surface 5a converging towards its horizontal surface 5b in the forward direction of movement of the mat 1 and the conveyers 2 and 3. The rearward flank 7 of the wedge-shaped body 5 is spaced from the rounded edge 4a of the tongue 2c by a distance equal to at least the combined thickness of the bands 2 and 3 so as to form a step-like deflection 3f in the band 3 as it passes from the underside of the tongue 2c onto the surface 5a. The smaller this spacing, the closer the deflection 3f resembles a step. Preferably, it is desirable that the angle α at which the stretch 3a ascends to the surface 5a, be 45° or more. However, better results are obtained when this angle is substantially 75–90°. The angular inclination β of the surface 5a to the horizontal can range between 2 and 15° but is preferably about 5°. It is thus apparent that, when the leading edge 6 of the mat 1 is advanced onto the surface 5a, the rising portion 3f of the band lifts the mat which substantially is maintained in its original plane as it moves off the tongue 2c and onto the surface 5a, any deflection to straighten the mat occurring only after the transfer is completed. It has been found to be advantageous to mount a guide strip 9 beneath the rounded edge 4a and the return stretch 2c' of band 2 and the upper stretch 3a of the receiving band 3 to limit any frictional contact between the two bands. Member 9 can be coated with polytetrafluorethylene or other antifriction material or can be constituted of a synthetic resin.

I claim:

1. In a transport system for the deposition of a loosely coherent mat from a depositing conveyer onto a receiving conveyer, the improvement wherein said depositing conveyer has an upper reach adapted to carry a mat and displaceable in the direction of a discharge end of the depositing conveyer at which said upper reach is turned under to form a return reach of the depositing conveyer; said receiving conveyer has an upper reach underlying the discharge end of said depositing conveyer; and a wedge-shaped deflecting body having an upper surface inclined downwardly in said direction is disposed beneath the upper reach of said receiving conveyer ahead of said discharge end so as to render said receiving and depositing conveyer substantially coplanar in the region of said discharge end and deflecting said upper reach of said receiving conveyer in generally S-shaped configuration onto the upper surface of said deflecting body.

2. The improvement defined in claim 1 wherein said depositing conveyer is formed at said discharge end with a tongue inclined downwardly in said direction for directing the mat onto said receiving conveyer and synchronously displaceable with the conveyer band of said depositing conveyer, said body being operatively connected with said tongue for joint movement therewith.

3. The improvement defined in claim 2, further comprising a thin separating member disposed between the bands of said conveyers at said discharge end.

4. The improvement defined in claim 3 wherein said separating member is coupled with said tongue and said body for movement jointly therewith.

5. The improvement defined in claim 4, further comprising cantilever support means carried by said tongue and supporting said member and said body.

6. The improvement defined in claim 1, further comprising a thin separating member disposed between the bands of said conveyers at said discharge end.

References Cited

UNITED STATES PATENTS

| | | | |
|---|---|---|---|
| 2,870,898 | 1/1959 | Naylor et al. | 198—20 |
| 3,224,758 | 12/1965 | Siempelkamp | 271—69 X |

ROBERT G. SHERIDAN, Primary Examiner

U.S. Cl. X.R.

271—76